United States Patent [19]

Straza

[11] 4,428,361
[45] Jan. 31, 1984

[54] SOLAR HEATING SHINGLE ROOF STRUCTURE

[76] Inventor: George T. Straza, 1071 Industrial Pl., El Cajon, Calif. 92020

[21] Appl. No.: 694,959

[22] Filed: Jun. 11, 1976

[51] Int. Cl.³ .............................................. F24J 3/02
[52] U.S. Cl. .................................... 126/432; 126/444; 126/DIG. 2; 52/533; 165/116; 165/169; 165/170
[58] Field of Search ............... 126/270, 271, 432, 444, 126/445, DIG. 2, 450, 417; 237/1 A; 165/116, 168, 169, 170; 52/518, 533

[56] References Cited

U.S. PATENT DOCUMENTS

| 2,624,298 | 1/1953 | Farren | 52/533 |
| 3,513,828 | 5/1970 | Masters | 126/271 |
| 3,919,998 | 11/1975 | Parker | 126/271 |
| 3,965,887 | 6/1976 | Gramer et al. | 126/271 |
| 3,996,918 | 12/1976 | Quick | 126/270 |

FOREIGN PATENT DOCUMENTS

| 257425 | 5/1963 | Australia | 126/271 |
| 762759 | 9/1934 | France | 126/271 |
| 1900069 | 9/1970 | Fed. Rep. of Germany | 126/271 |
| 2309307 | 8/1974 | Fed. Rep. of Germany | 126/271 |

*Primary Examiner*—James C. Yeung
*Attorney, Agent, or Firm*—Brown & Martin

[57] ABSTRACT

A solar heating roof shingle roof structure which combines the functions of a roof and a fluid conducting solar heating panel. Each shingle is a hollow body of the general size and configuration of a conventional shingle, and is provided with a fluid inlet and a fluid outlet. Shingles are assembled in a normal overlapping array to cover a roof structure, with interconnections between the inlets and outlets of successive shingles to provide a fluid path through the complete array. An inlet manifold is contained in a cap used at the peak of the roof and an outlet manifold is connected to the lowest row of shingles.

16 Claims, 8 Drawing Figures

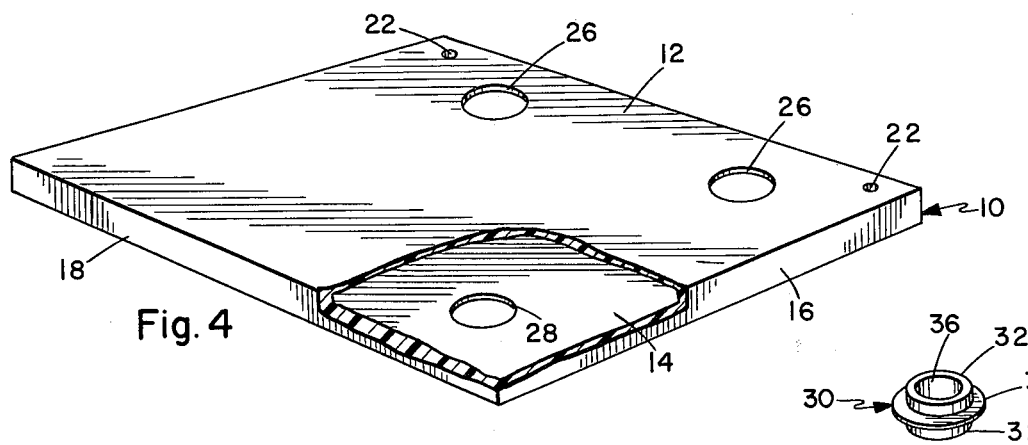
Fig. 4
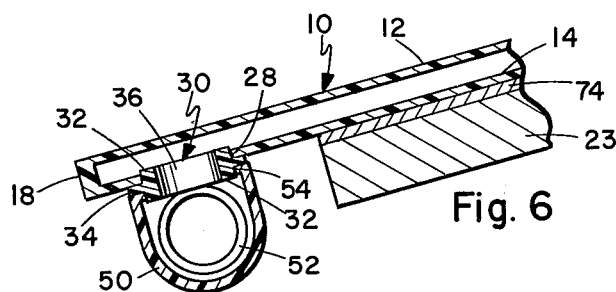
Fig. 5
Fig. 6
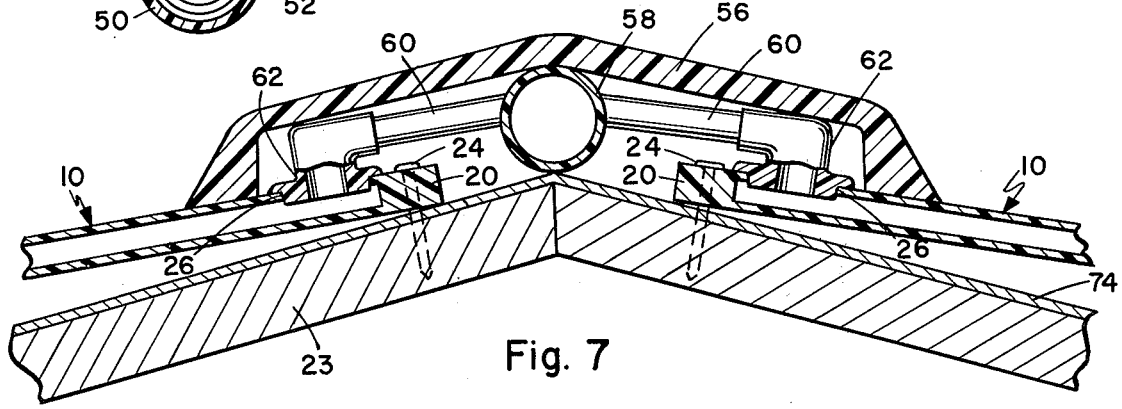
Fig. 7
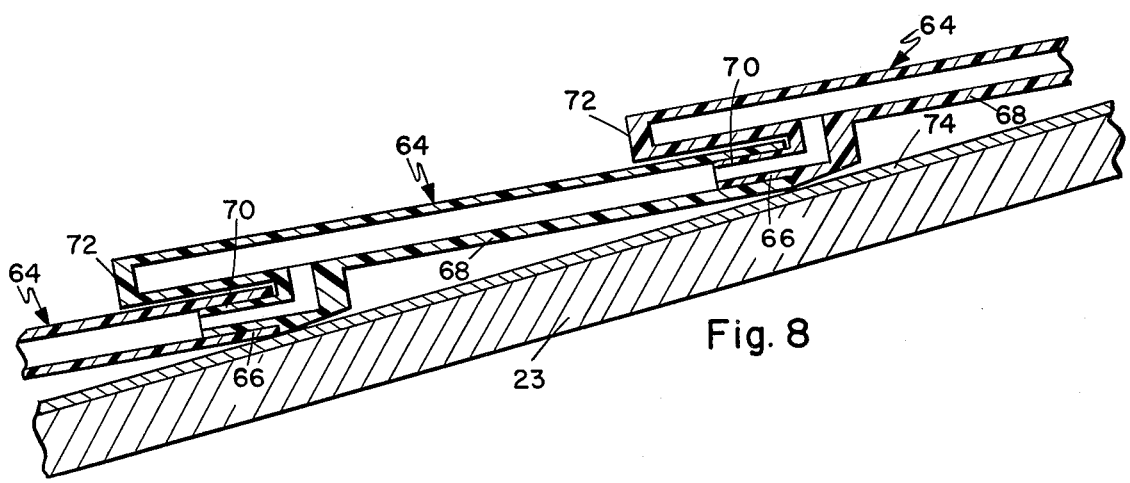
Fig. 8

SOLAR HEATING SHINGLE ROOF STRUCTURE

BACKGROUND OF THE INVENTION

Roof mounted solar heating panels have been constructed in many different forms and are usually self contained units, which are attached to or inset in a portion of a roof. The cost of the panel structure is additional to the roof, and in many installations the roof structure does not provide an ideal support. When solar panels are applied to an existing building, they often detract from the appearance of the structure.

SUMMARY OF THE INVENTION

The structure described herein incorporates a fluid conducting solar heating panel into a shingled roof. Each individual shingle is a hollow body with the general size and configuration of a conventional roof shingle, and has at least one inlet and outlet for fluid flow through the interior of the body. In the preferred form the shingles are assembled in the usual overlapping array, with plug type connectors between the inlets and outlets of successive shingles. In another form, plug and socket connections are incorporated in the shingles.

Each shingle has solid portions with predrilled nail holes for securing the shingle in a conventional manner without the danger of leakage. Fluid, such as water, is fed into the upper portion of the shingle assembly from an inlet manifold contained in a cap, as normally used at the peak of a roof. An outlet manifold is connected to the outlets of the lowest row of shingles.

The shingles can be transparent, or made decorative in any suitable manner which will permit efficient heating of the fluid passing through. Various fluid flow and control systems may be used with the shingle installation, depending on the particular use for and type of fluid to be heated.

The primary object of this invention, therefore, is to provide a new and improved solar heating shingle roof structure.

Another object of this invention is to provide a roof structure of hollow, fluid conducting, interconnected shingles.

Another object of this invention is to provide a solar heating shingle roof with inlet and outlet manifolds incorporated into the basic roof structure.

A further object of this invention is to provide a solar heating shingle roof utilizing standardized shingles and connectors, which can be assembled to form partial or complete roof structures of any desired size.

Other objects and advantages will be apparent in the following detailed description, taken in conjunction with the accompanying drawings, in which:

FIG. 4 is a perspective view, partially cut away, of one shingle.

FIG. 5 is a perspective view of a connector for joining the shingles.

FIG. 6 is an enlarged sectional view taken on line 6—6 of FIG. 1.

FIG. 7 is a sectional view similar to FIG. 3, showing an alternative inlet manifold.

FIG. 8 is a sectional view similar to FIG. 2, showing an alternative plug and socket connection between shingles.

DESCRIPTION OF THE PREFERRED EMBODIMENTS

Figures 1, 2, 3:
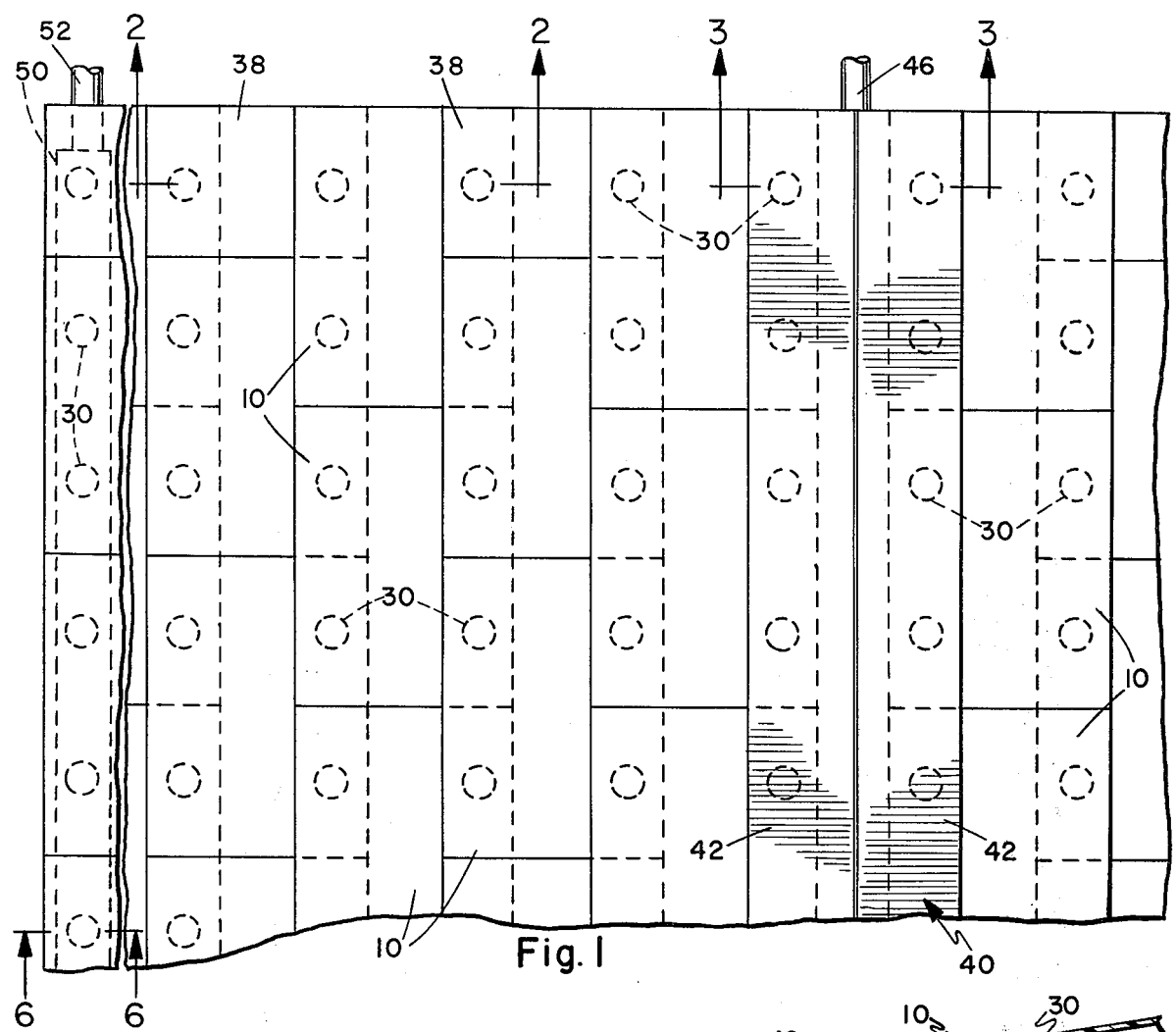
FIG. 1 is a top plan view of a portion of a typical roof structure.
FIG. 2 is an enlarged sectional view taken on line 2—2 of FIG. 1.
FIG. 3 is an enlarged sectional view taken on line 3—3 of FIG. 1.

The roof structure illustrated in FIGS. 1-6 is composed of a plurality of shingles 10, assembled in overlapping rows in the manner of a conventional shingle roof. Each shingle 10 is a thin flat hollow body in the general size and configuration of a conventional roof shingle, and has an upper panel 12, a lower panel 14, side walls 16, a front edge of wall 18 and a rear edge or wall 20. As installed, the rear wall 20 is toward the high point of the roof and is of sufficient width to accommodate preformed nail holes 22. The shingle can thus be nailed to existing roof sub-structure 23, in a normal manner, without possibility of leakage, by conventional roofing or other nails 24. Each shingle has at least one inlet and outlet to conduct fluid. For the staggered overlapping array illustrated it is necessary to have a pair of inlet openings 26 in upper panel 12, adjacent the rear wall 20. Lower panel 14 has a corresponding pair of outlet openings 28 adjacent the front wall 18. The openings are positioned so that, when the shingles are correctly overlapped, the outlet openings of one shingle will be directly above the inlet openings of the next lower shingle.

The shingles may be made of plastic material, preferably transparent, but could be of other materials which would provide the necessary heating characteristics. For decorative purposes, upper panel 12 could have a simulated wood grain or other such finish.

The panels are joined by connectors 30, as in FIG. 5. The connector is a double sided plug element having opposed tapered plug portions 32 separated by an annular flange 34, and with a central bore 36. Plug portions 32 are a tight press fit into the respective inlet and outlet openings and flange 34 limits the penetration of the connector into a shingle. The connector is preferably of rubber or plastic material having sufficient rigidity to maintain a good connection, but having a surface deformability to wedge tightly into the shingle openings.

As illustrated in the longitudinally staggered array of FIG. 1, half shingles 38 are used at the end of the roof structure to form an even edge, and each is essentially one half of a full shingle 10. The respective parts are correspondingly numbered in FIG. 2.

At the peak of the roof, as in FIG. 3, the gap between the uppermost rows of shingles is covered by a cap 40, having extending side portions 42 which overlap the shingles. The cap 40 is hollow and contains an inlet manifold chamber 44, to which fluid is supplied by an inlet pipe 46. The cap is connected to the shingles by connectors 30 seated in the inlet openings 26 of the shingles, and into outlet openings 48 in the cap.

At the lower edge of the roof is a tubular outlet manifold 50 having an outlet pipe 52. The outlet manifold is coupled to the lowermost row of shingles by connectors 30 seated in the outlet openings 28 of the shingles and in similar openings 54 in the manifold, as in FIG. 6.

An alternative upper cap arrangement is illustrated in FIG. 7, in which the cap 56 is a protective cover for an inlet manifold pipe 58. Branch pipes 60 extend from the manifold pipe 58 to connectors 62, which plug into the inlet openings 26 of the shingles 10. A single manifold pipe is shown, but a separate manifold could be used for each side of the roof if necessary. The cap 56 extends to cover all of the branch connections in either form.

FIG. 8 illustrates an alternative structure for interconnecting the shingles for a continuous fluid path. Each shingle 64 has one or more openings in the rear wall to provide an inlet socket portion 66. In the lower panel 68 of each shingle 64 is a downwardly and forwardly projecting outlet plug portion 70, which seats firmly in the socket portion of the next lower shingle. The plug portion 70 is set back from the front wall 72 to provide a suitable overlap of the shingles. The plug and socket portions can be small tubular elements or can be elongated to obtain the required fluid passage area. The basic structure and attachment means are otherwise similar to shingle 10.

The shingles are preferably applied to the roof structure 23 over a layer of insulation material 74, such as the usual black roofing felt or tar paper. This layer absorbs heat under the shingle covering and increases the heating efficiency.

Various types of fluid flow and control systems can be connecting between the inlet and outlet pipes 46 and 52. In a hot water heating system, a pump would circulate the water, with thermostatic or other control means, and the hot water would be stored in a suitable reservoir. For the most efficient heating effect it is desirable to control the water flow so that water passes through the shingles in a thin sheet, rather than completely filling the shingles. Air can also be blown through the shingle assembly for heating.

The easily connected shingles make it possible to build up a roof covering of any desired size to suit the heating capacity required. Techniques are similar to the installation of conventional shingling and no special tools are needed. In most instances it would not be necessary to cover an entire roof with a solar heating array, merely portions of the roof with the best sun exposure. By using the shingles, the solar heating portion of the roof can if required, be effectively blended in to the overall structure. Further, by combining the functions of the roof covering and a solar heating panel, the initial cost of installing a solar heating system is greatly reduced.

Having described my invention, I now claim.

1. A solar heating shingle roof structure, comprising, a plurality of laterally extending longitudinally overlapping rows of interconnected, fluid conducting shingles having means for attachment to a roof structure,
each shingle comprising a hollow body of substantially rectangular, thin, flat configuration, having an upper surface, a lower surface, a front longitudinal edge and a rear longitudinal edge,
each shingle having at least one fluid inlet adjacent the rear edge for communicating with the outlet of an overlapping shingle and at least one fluid outlet adjacent the front edge thereof for communicating with the inlet of an overlapped shingle,
and means for interconnecting the inlets and outlets of adjacent overlapping shingles.

2. A solar heating structure comprising:
conduit means for carrying a fluid to and from the solar heating structure;
a hollow body member having upper, lower, front and rear surfaces forming a closed surface;
the upper surface of said body member simulating the appearance of at least one common building shingle such that at least one of said body members when fixedly attached to a building simulates the appearance of a plurality of laterally extending and longitudinally overlapped shingles;
said hollow body member having fluid orifice means in its front and rear surfaces;
connecting means for interconnecting said orifice means to said conduit means.

3. A solar heating shingle roof structure, comprising, a plurality of laterally extending longitudinally overlapping rows of interconnected, fluid conducting shingles having means for attachment to a roof structure,
each shingle comprising a hollow body of substantially rectangular, thin, flat configuration, having an upper surface, a lower surface a front longitudinal edge and a rear longitudinal edge,
each shingle having at least one fluid inlet adjacent the rear edge for communicating with the outlet of an overlapping shingle and at least one fluid outlet adjacent the front edge thereof for communicating with the inlet of an overlapped shingle,
and plug means for interconnecting the inlets and outlets of adjacent overlapping shingles.

4. A solar heating shingle roof structure according to claim 3, wherein said means for attachment comprises a solid portion adjacent the rear edge of the shingle, with preformed nail holes therethrough.

5. A solar heating shingle roof structure according to claim 3, and including an inlet manifold connected to the inlets of the row of shingles at one edge of the structure,
and an outlet manifold connected to the outlets of the row of shingles at the other edge of the structure.

6. A solar heating shingle roof structure according to claim 5, wherein said inlet manifold includes a roof peak cap member in which the inlet manifold is contained.

7. A solar heating shingle roof structure according to claim 5, wherein said inlet manifold comprises a roof peak cap member having at least one side portion overlapping the connected row of shingles, said cap member being hollow and the interior thereof being a manifold chamber.

8. A solar heating shingle roof structure according to claim 5, wherein said inlet manifold is a pipe having branch connections to said shingles,
and a cap member covering said manifold pipe and branch connections.

9. A solar heating shingle roof structure according to claim 3, wherein said inlet is an opening in said upper surface and said outlet is a corresponding opening in the lower surface.

10. A solar heating shingle roof structure according to claim 9, wherein said plug means comprises a double ended plug for fitting tightly in confronting inlet and outlet openings of overlapping shingles, said plug having a fluid conducting bore therethrough.

11. A solar heating shingle roof structure according to claim 10, wherein said plug has an annular insertion limiting flange between the ends thereof.

12. A solar heating shingle roof structure according to claim 3, wherein said plug means comprises a plug extending downwardly and forwardly from the lower surface of each shingle at the outlet thereof, the rear edge of each shingle having a socket for receiving the plug when the respective shingles are overlapped.

13. A solar heating roof shingle for defining a roof structure conveying a heat transfer liquid from an upslope shingle to a downslope shingle, comprising:

a hollow body of substantially rectangular, thin, flat configuration having an upper surface, a lower surface spaced from said upper surface for defining a longitudinally extending liquid flow cavity for conveying as a heat transfer liquid by gravity flow from an upper like shingle to a lower like shingle, said shingle having a front longitudinal edge for overlapping a lower shingle and a rear longitudinal edge for being overlapped by an upper shingle for defining a weather tight roof structure, said body having at least one liquid inlet defining a socket adjacent the rear edge communicating with said flow cavity for receiving an outlet plug of an upslope shingle, and at least one fluid outlet adjacent the front edge thereof communicating with said cavity and including plug means for fitting into a socket in a downslope shingle for conveying liquid by gravity thereto;

and means in said body for attachment to a roof structure.

14. A solar heating roof shingle according to claim 13, wherein said inlet is an opening in said upper surface for communicating with the outlet of an overlapping shingle, and said outlet is a corresponding opening in the lower surface for communicating with the inelt of an overlapped shingle.

15. A solar heating roof shingle according to claim 13, wherein said inlet is a socket in said rear edge, and said outlet is a corresponding plug projecting forward from said lower surface.

16. A solar heating roof shingle according to claim 13, wherein said attachment means comprises a solid portion of the body adjacent said rear edge, with nail receiving holes therethrough.

* * * * *